United States Patent
Eckert et al.

(10) Patent No.: US 8,977,273 B2
(45) Date of Patent: Mar. 10, 2015

(54) METHOD FOR SELECTING A MOBILE RADIO AREA, MOBILE RADIO COMMUNICATION DEVICE, METHOD FOR TRANSMITTING SIGNALS INTO A MOBILE RADIO AREA, AND MOBILE RADIO NETWORK UNIT

(75) Inventors: Michael Eckert, Braunschweig (DE); Martin Hans, Bad Salzdetfurth (DE); Hyung-Nam Choi, Hamburg (DE)

(73) Assignee: Intel Mobile Communications GmbH, Neubiberg (DE)

( * ) Notice: Subject to any disclaimer, the term of this patent is extended or adjusted under 35 U.S.C. 154(b) by 772 days.

(21) Appl. No.: 11/672,766

(22) Filed: Feb. 8, 2007

(65) Prior Publication Data

US 2008/0194264 A1 Aug. 14, 2008

(51) Int. Cl.
*H04W 36/00* (2009.01)
*H04W 68/02* (2009.01)
(Continued)

(52) U.S. Cl.
CPC .............. *H04W 68/02* (2013.01); *H04W 8/183* (2013.01); *H04W 48/08* (2013.01); *H04W 60/04* (2013.01)
USPC ........................... 455/442; 455/436; 370/331

(58) Field of Classification Search
CPC ... H04W 36/00; H04W 36/16; H04W 36/165; H04W 36/18; H04W 36/20; H04W 36/22; H04W 36/24; H04W 36/26; H04W 36/30; H04W 36/32; H04W 36/36; H04W 36/38
USPC .......... 455/436–445, 3.04; 713/323; 370/437, 370/331–334
See application file for complete search history.

(56) References Cited

U.S. PATENT DOCUMENTS 5,920,549 A * 7/1999 Bruckert et al. ............... 370/331
5,930,710 A * 7/1999 Sawyer et al. ................ 455/436
(Continued)

FOREIGN PATENT DOCUMENTS

DE 10 2004 027 811 A1 1/2006
DE 10 2005 009 897 A1 9/2006

OTHER PUBLICATIONS

3GPP TS 25.304 V6.9.0 (Mar. 2006); *Technical Specification*; 3rd Generation Partnership Project; Technical Specification Group Radio Access Network; User Equipment (UE) procedures in idle mode and procedures for cell reselection in connected mode (Release 6).
(Continued)

*Primary Examiner* — George Eng
*Assistant Examiner* — Marcus Hammonds
(74) *Attorney, Agent, or Firm* — Schwabe, Williamson & Wyatt, P.C.

(57) ABSTRACT

A method for selecting a mobile radio area includes a mobile radio communication device, which is in a state without having a signaling communication connection and a data communication connection with a mobile radio network unit in a first mobile radio area, leaving the first mobile radio area. The mobile radio communication device enters a second mobile radio area and receives in the mobile radio communication device first signals from the mobile radio network unit of the first mobile radio area and second signals from a mobile radio network unit of the second mobile radio area. Furthermore, the mobile radio communication device stores temporarily first mobile radio resource data about the first mobile radio area for a predetermined time period, wherein the first mobile radio resource data are used for receiving the first signals from the mobile radio network unit of the first mobile radio area and the mobile radio communication device storing at least partially at the same time second mobile radio resource data about the second mobile radio area, wherein the second mobile radio resource data are used for receiving the second signals from the mobile radio network unit of the second mobile radio area.

16 Claims, 5 Drawing Sheets

(51) Int. Cl.
*H04W 8/18* (2009.01)
*H04W 48/08* (2009.01)
*H04W 60/04* (2009.01)

(56) References Cited

U.S. PATENT DOCUMENTS

| | | | |
|---|---|---|---|
| 6,311,059 B1* | 10/2001 | Walton | 455/425 |
| 6,363,260 B1* | 3/2002 | Achour et al. | 455/553.1 |
| 6,647,261 B1* | 11/2003 | Banerjee | 455/436 |
| 7,792,079 B2 | 9/2010 | Choi et al. | |
| 7,796,994 B2 | 9/2010 | Klatt | |
| 2003/0103479 A1* | 6/2003 | Anderson et al. | 370/335 |
| 2004/0043798 A1* | 3/2004 | Amerga et al. | 455/574 |
| 2005/0048982 A1* | 3/2005 | Roland et al. | 455/449 |
| 2006/0003767 A1* | 1/2006 | Kim et al. | 455/436 |
| 2006/0109817 A1* | 5/2006 | Ramanna et al. | 370/331 |

OTHER PUBLICATIONS

3GPP TS 25.331 V6.12.9 (Dec. 2006); *Technical Specification*; 3rd Generation Partnership Project; Technical Specification Group Radio Access Network; Radio Resource Control (RRC); Protocol Specification (Release 6).

3GPP TS 24.008 V6.15.0 (Dec. 2006); *Technical Specification*; 3rd Generation Partnership Project; Technical Specification Group Core Network and Terminals; Mobile radio interface Layer 3 specification; Core network protocols; Stage 3 (Release 6).

Office Action, issued in German Patent Application No. 102008007921.9 mailed Sep. 9, 2012, 10 pages.

Office Action, issued in German Patent Application No. 102008007921.9 mailed Jan. 9, 2014, 5 pages.

* cited by examiner

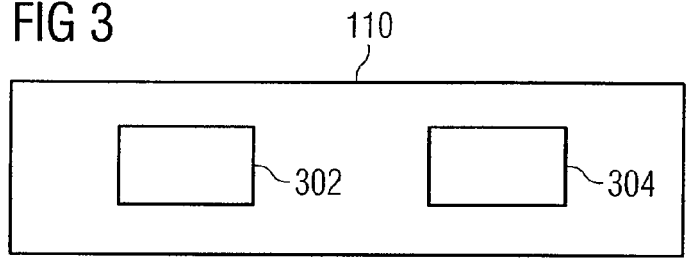
FIG 3
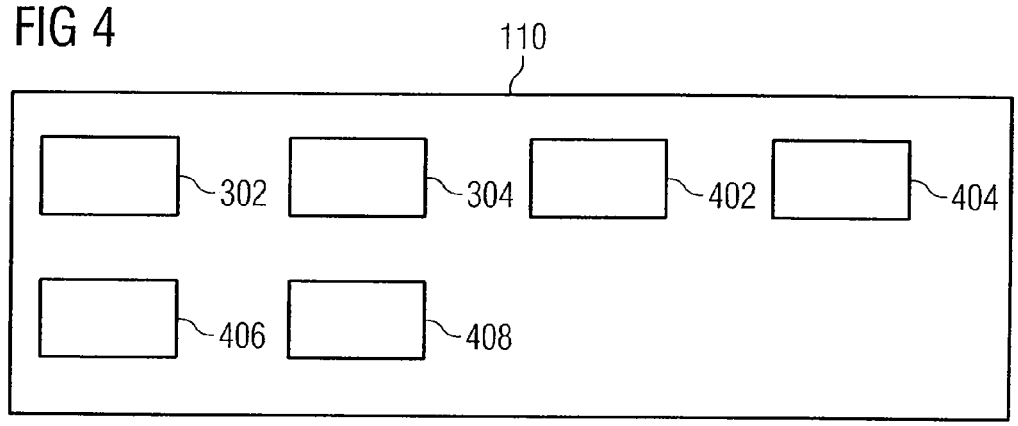
FIG 4
FIG 5
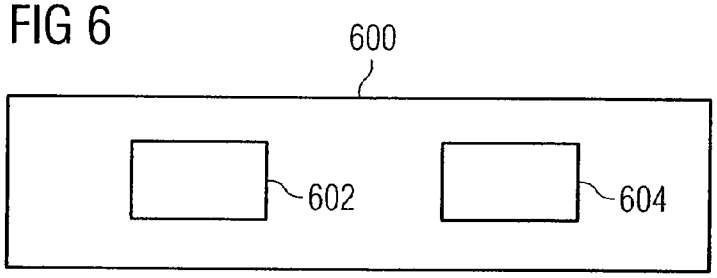
Timing the transmission of paging signals into the mobile radio area such that a mobile communication device being located in the mobile radio area can receive the paging signals of the mobile radio area and paging signals transmitted into another mobile radio area — 502
FIG 6

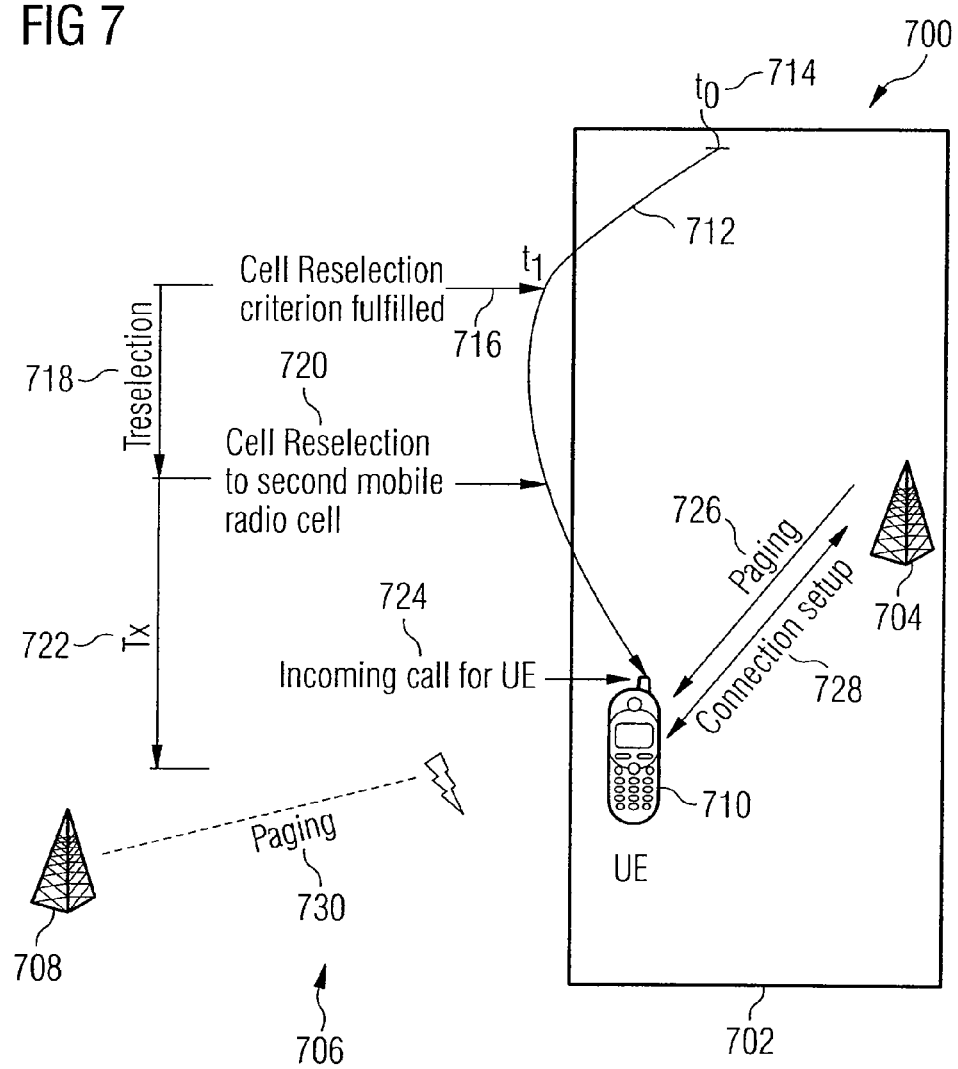

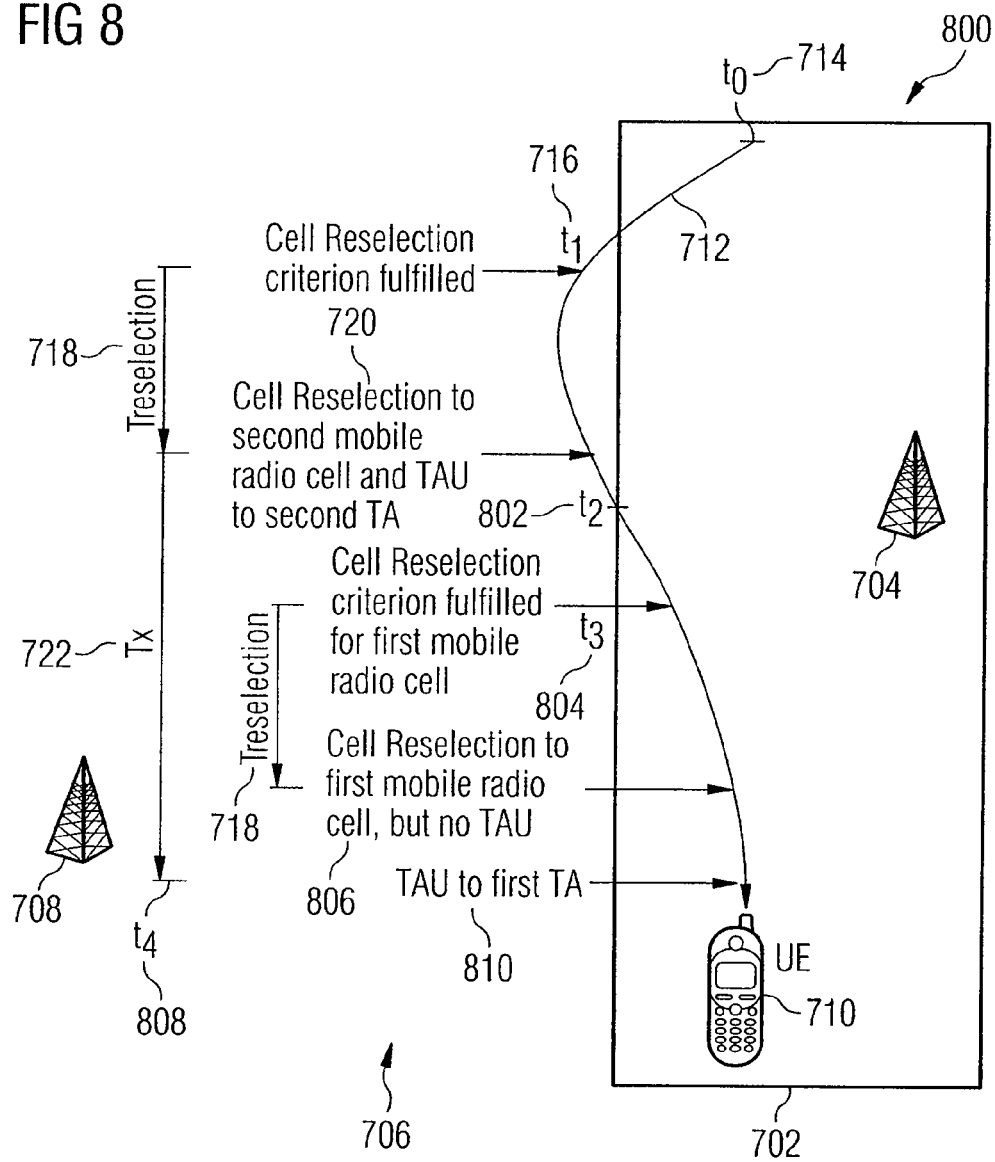

METHOD FOR SELECTING A MOBILE RADIO AREA, MOBILE RADIO COMMUNICATION DEVICE, METHOD FOR TRANSMITTING SIGNALS INTO A MOBILE RADIO AREA, AND MOBILE RADIO NETWORK UNIT

BACKGROUND

The present invention relates generally to a method for selecting a mobile radio area, a mobile radio communication device, a method for transmitting signals into a mobile radio area and a mobile radio network unit.

In accordance with a Universal Mobile Telecommunications System (UMTS) like communication system, a mobile radio communication device may be in an idle mode, in which its position is known to the communication network on the level of a supply region, for example a so-called registration area (RA) according to UMTS or tracking area (TA) according to Long Term Evolution (LTE).

Due to the mobility of the mobile radio communication device, it may select or re-select a mobile radio cell or a supply region. After the selection or the re-selection, the mobile radio communication device then receives signals via one or more channels provided by the new mobile radio cell or supply region.

Thus, there is a need for efficiently providing a selection or re-selection of a mobile radio cell or a supply region within a mobile radio communication system.

SUMMARY OF THE INVENTION

An embodiment of the invention provides a method for selecting a mobile radio area. The method includes a mobile radio communication device, which is in a state without having a signaling communication connection and a data communication connection with a mobile radio network unit in a first mobile radio area, leaving the first mobile radio area. The mobile radio communication device enters a second mobile radio area and receives in the mobile radio communication device first signals from the mobile radio network unit of the first mobile radio area and second signals from a mobile radio network unit of the second mobile radio area. Furthermore, the mobile radio communication device stores temporarily first mobile radio resource data about the first mobile radio area for a predetermined time period, wherein the first mobile radio resource data are used for receiving the first signals from the mobile radio network unit of the first mobile radio area and the mobile radio communication device stores at least partially at the same time second mobile radio resource data about the second mobile radio area, wherein the second mobile radio resource data are used for receiving the second signals from the mobile radio network unit of the second mobile radio area.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 3 shows a mobile radio communication device in accordance with an embodiment of the invention;

FIG. 4 shows a mobile radio communication device in accordance with another embodiment of the invention;

FIG. 5 shows a method for transmitting signals into a mobile radio area in accordance with an embodiment of the invention;

FIG. 6 shows a mobile radio network unit in accordance with an embodiment of the invention;

FIG. 7 shows an embodiment of the invention; and

FIG. 8 shows an embodiment of the invention.

DESCRIPTION

In the described embodiments, a mobile radio communication system is provided, e.g. a cellular mobile radio communication system, e.g. one of the following communication systems:

a mobile radio communication system according to a Group Special Mobil (GSM) standard;

a mobile radio communication system according to a Third Generation Partnership Project (3GPP) standard such as e.g. according to a General Packet Radio System (GPRS) standard, according to an Enhanced Data for GSM Evolution (EDGE) Standard, according to a Universal Mobile Telephone System (UMTS) standard, according to a Long Term Evolution (LTE) standard, etc.;

a mobile radio communication system according to a Freedom of Mobile Multimedia Access (FOMA) standard;

a mobile radio communication system according to a Code Division Multiple Access (CDMA) standard;

a mobile radio communication system according to a Code Division Multiple Access (CDMA) 200 standard;

etc.

In an alternative embodiment of the invention, any other suitable mobile radio communication system may be provided.

In one embodiment of the invention, the mobile radio communication system is an LTE mobile radio communication system, i.e. a further developed UMTS mobile radio communication system based on the multiple access scheme OFDMA (Orthogonal Frequency Division Multiple Access) in downlink transmission direction (i.e. for example in a transmission direction from a mobile radio communication network unit such as a mobile radio base station to the mobile radio communication device such as for example a User Equipment (UE)) and SC-FDMA (Single Carrier Frequency Division Multiple Access) in uplink transmission direction (i.e. for example in a transmission direction from a mobile radio communication device such as for example a User Equipment (UE) to a mobile radio communication network unit such as a mobile radio base station.

In an LTE mobile radio communication system the mobile radio devices are still called User Equipment (UE), for example, as in accordance with UMTS. The mobile radio communication network includes the so-called Core Network (CN) and the Radio Access Network (RAN).

Figure 1:
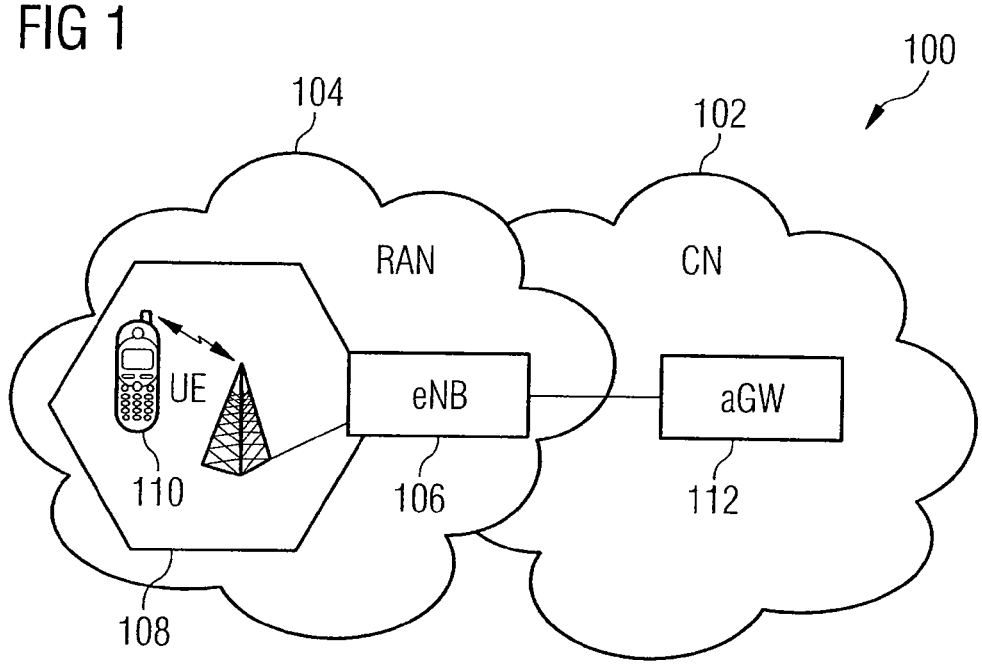
FIG. 1 shows a mobile radio communication system in accordance with an embodiment of the invention.

FIG. 1 shows an LTE mobile radio communication system 100 in accordance with an embodiment of the invention including the Core Network 102 and the Radio Access Network 104.

In an embodiment of the invention, the Radio Access Network 104 includes one base station or a plurality of base stations (eNB) 106. Although only one base station is shown in FIG. 1, in an alternative embodiment of the invention, an arbitrary number of base stations 106 may be provided. In an embodiment of the invention, the LTE mobile radio communication system 100 includes a plurality of mobile radio supply areas, e.g. mobile radio communication cells 108. In an embodiment of the invention, one or a plurality of base stations 106 is respectively assigned to each mobile radio supply area. The base station 106 provides a radio communication connection to a mobile radio communication device 110 (e.g. a mobile radio communication terminal such as e.g. a User Equipment (UE)) that is positioned in the range of the mobile radio supply area 108, the base station 106 is responsible for. In general, an arbitrary number of mobile radio communication devices 110 may be provided and supplied in each mobile radio supply area 108.

In accordance with LTE, the Core Network 102 includes, inter alia, an Access Gateway (aGW) 112 which provides e.g. the communication protocol for handling the mobility of mobile radio communication devices (Mobility Management, MM).

The mobile radio communication device 110 may be in different communication protocol states. By way of example, the mobile radio communication device 110 may be in the following communication protocol states in accordance with a layer 3 protocol, e.g. in accordance with the Radio Resource Protocol (RRC):

Idle Mode State:

In the Idle Mode state, the mobile radio communication device 110 has neither a signaling communication connection nor a data communication connection with a mobile radio network unit, e.g. a base station. The location of the mobile radio communication device 110 is known on UMTS terrestrial radio access network (UTRAN) registration area level (in accordance with LTE, the location of the mobile radio communication device 110 is known on URA tracking area level, for example).

URA_PCH State:

In the URA_PCH state, the mobile radio communication device 110 has no allocated dedicated channel to the mobile radio network unit, e.g. a base station. The mobile radio communication device 110 may select a paging channel (PCH) and uses discontinuous reception (DRX) for monitoring the selected PCH via an associated paging indicator channel (PICH). In this communication protocol state, no uplink activity is possible. The location of the mobile radio communication device 110 is known on UMTS terrestrial radio access network (UTRAN) registration area level according to the URA assigned to the mobile radio communication device 110 during the last URA update in the CELL_FACH state (in accordance with LTE, the location of the mobile radio communication device 110 is known on URA tracking area level, for example).

CELL_PCH State:

In the CELL_PCH state, the mobile radio communication device 110 has no allocated physical channel to the mobile radio network unit, e.g. a base station. The mobile radio communication device 110 may select a paging channel (PCH) and uses discontinuous reception (DRX) for monitoring the selected PCH via an associated paging indicator channel (PICH). In this communication protocol state, no uplink activity is possible. The location of the mobile radio communication device 110 is known by UTRAN (in accordance with LTE e.g. by URA) on mobile radio cell level according to the mobile radio cell where the mobile radio communication device 110 last made a mobile radio cell update in CELL_FACH state.

CELL_FACH State:

In the CELL_FACH state, the mobile radio communication device 110 has no allocated dedicated physical channel to the mobile radio network unit, e.g. a base station. The mobile radio communication device 110 continuously monitors a forward access channel (FACH) in the downlink. The mobile radio communication device 110 is assigned a default common or shared transport channel in the uplink (e.g. random access channel (RACH)) that it can use anytime according to the access procedure for that transport channel. The location of the mobile radio communication device 110 is known by UTRAN (in accordance with LTE e.g. by URA) on mobile radio cell level according to the mobile radio cell where the mobile radio communication device 110 last made a mobile radio cell update. In time division duplex (TDD) mode, one or several uplink shared channels (USCH) or downlink shared channels (DSCH) transport channels may have been established.

CELL_DCH State:

In the CELL_DCH state, the mobile radio communication device 110 has an allocated dedicated physical channel to the mobile radio network unit, e.g. a base station, in uplink and in downlink. The mobile radio communication device 110 is known on mobile radio cell level according to its current active set. Dedicated transport channels, downlink and uplink (TDD) shared transport channels, and a combination of these transport channels can be used by the mobile radio communication device 110.

Thus, in the Idle Mode state, the mobile radio communication device 110 and thus its location is known on Mobility Management protocol level within a supply area (e.g. the registration area or the tracking area) which may be configured by the mobile radio provider. The supply area (e.g. the registration area or the tracking area) may include one mobile radio cell or a plurality of mobile radio cells. In the example of LTE, the supply area is also referred to as tracking area (TA). In the case of an incoming call or a beginning data transmission, first of all, the mobile radio communication device 110 is called for (also referred to as "paged") in the entire supply region using a so-called paging message in order to be able to determine the residence of the mobile radio communication device 110 on mobile radio cell level.

Due to the mobility of a mobile radio communication device, mobile radio cell changes (also referred to as switching or re-selecting) within a mobile radio communication system, e.g. within an LTE mobile radio communication system are possible at any time. Before a mobile radio communication device switches into another mobile radio cell (in other words, before a mobile radio communication device re-selects another mobile radio cell to camp on), the mobile radio communication device, which is in the Idle Mode, reads the system information (which may be received via so-called system information blocks (SIB)) sent by the possible new mobile radio cell. In case that the possible new mobile radio cell fulfills predefined criteria for a predetermined time period (which is also referred to as $T_{reselection}$) the mobile radio communication device switches to this new mobile radio cell. In this case, the mobile radio communication device carries out a cell reselection procedure (Cell Reselection). The mobile radio communication device then receives and transmits its information using the radio channels of this new mobile radio cell.

In this case, the new mobile radio cell may belong to the same supply region as the old mobile radio cell. However, the new mobile radio cell may also belong to a different supply region than the old mobile radio cell.

If the mobile radio communication device determines that it is located in the supply area of a new supply region when reading the system information (e.g. when reading the NAS system information in system information block 1 (SIB1) in accordance with UMTS or LTE), the mobile radio communication device informs the MM layer unit in the mobile radio communication device about this. In response to this notification, the MM layer unit in the mobile radio communication device initiates a supply area update procedure (e.g. a tracking area update procedure (TAU)), in which the MM layer unit in the mobile radio communication device informs the corresponding MM layer unit in the core network (CN), in which new supply area the mobile radio communication device is now located and in which new supply area the mobile radio communication device should be paged from now on.

In order to prevent the mobile radio communication device after having successfully completed a Cell Reselection from immediately switching back to the old mobile radio cell (so-called ping-pong effect) since the mobile radio communication device is located near the mobile cell border, for example, usually the cell reselection criteria have to meet predefined values for a predetermined time period $T_{reselection}$, before another Cell Reselection procedure (and where necessary, another TAU procedure) could be initiated. By way of example, the time period $T_{reselection}$ can be up to 31 seconds.

If the mobile radio communication device after having successfully completed a Cell Reselection is located in the mobile cell border region or if the mobile radio communication device moves back into the supply region of the old mobile radio cell, the mobile radio communication device may not be reachable in particular cases, in other words, it may no longer be possible to page the mobile radio communication device and the mobile radio communication device may no longer be able to deposit its messages. Only after another Cell Reselection it may again access the "old" resources.

Thus, in this case, the mobile radio communication device may possibly not be reachable for a longer time period. Furthermore, in this case, a high signaling expense is required for additional Cell Reselection procedures and supply region update procedures (e.g. TAU procedures).

In an embodiment of the invention, methods carried out in the mobile radio communication device as well as in the mobile radio network are provided that improves the reachability of mobile radio communication devices.

Figure 2:
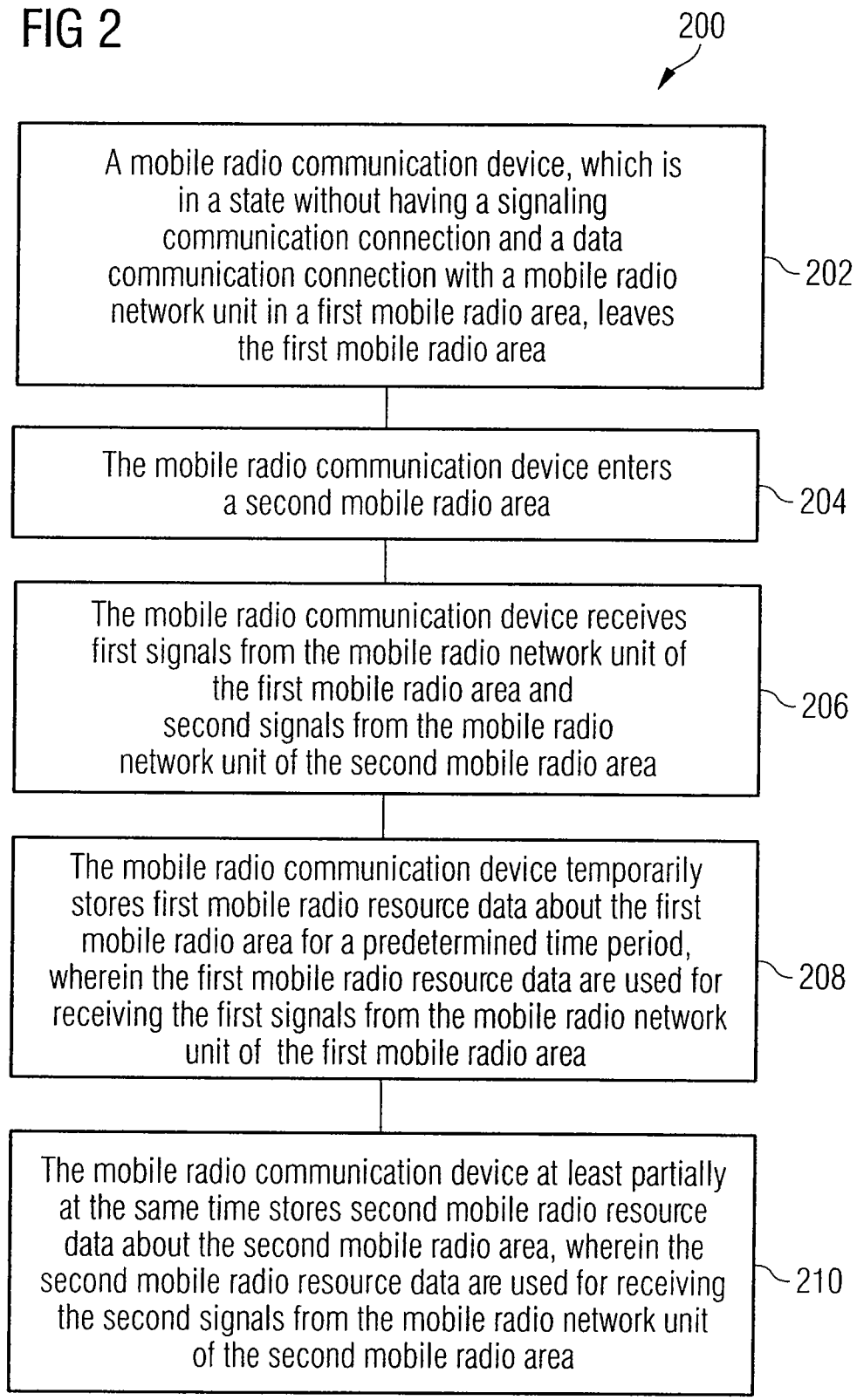
FIG. 2 shows a method for selecting a mobile radio area in accordance with an embodiment of the invention.

FIG. 2 shows a method 200 for selecting a mobile radio area in accordance with an embodiment of the invention.

At 202, a mobile radio communication device (e.g. a mobile radio communication device 110), which is in a state without having a signaling communication connection and a data communication connection with a mobile radio network unit in a first mobile radio area (e.g. in the Idle Mode state), leaves the first mobile radio area.

At 204, the mobile radio communication device enters a second mobile radio area (in an embodiment of the invention, at 204, the mobile radio communication device is still in a state without having a signaling communication connection and a data communication connection with a mobile radio network unit in a first mobile radio area (e.g. in the Idle Mode state)).

At 206, the mobile radio communication device receives first signals from the mobile radio network unit of the first mobile radio area and second signals from a mobile radio network unit of the second mobile radio area (in an embodiment of the invention, at 206, the mobile radio communication device is still in a state without having a signaling communication connection and a data communication connection with a mobile radio network unit in a first mobile radio area (e.g. in the Idle Mode state)).

In an embodiment of the invention, at 208, the mobile radio communication device temporarily stores first mobile radio resource data about the first mobile radio area for a predetermined time period, wherein the first mobile radio resource data are used for receiving the first signals from the mobile radio network unit of the first mobile radio area.

Furthermore, at 210, in an embodiment, the mobile radio communication device at least partially at the same time stores second mobile radio resource data about the second mobile radio area, wherein the second mobile radio resource data are used for receiving the second signals from the mobile radio network unit of the second mobile radio area.

In an embodiment of the invention, the mobile radio communication device tunes its receiver such that it receives the first signals from the mobile radio network unit via a first paging channel of the first mobile radio area. Furthermore, in an embodiment of the invention, the mobile radio communication device at the same time tunes its receiver such that it receives the second signals from the mobile radio network unit via a second paging channel of the second mobile radio area.

In another embodiment of the invention, the first mobile radio resource data about the first mobile radio area include data about a paging channel used by the mobile radio network unit of the first mobile radio area and the second mobile radio resource data about the second mobile radio area include data about a paging channel used by the mobile radio network unit of the second mobile radio area. In an embodiment of the invention, the first mobile radio resource data about the first mobile radio area may include data about the frequency range(s) used for the paging channel(s) by the first mobile radio base station 704. In addition, the first mobile radio resource data may include data about the frequency range(s) used for the uplink channel(s) that may be used for transmitting data from the mobile radio communication device to the first mobile radio base station 704. In an embodiment of the invention, the second mobile radio resource data about the second mobile radio area may include data about the frequency range(s) used for the paging channel(s) by the second mobile radio base station 708. In addition, the second mobile radio resource data may include data about the frequency range(s) used for the uplink channel(s) that may be used for transmitting data from the mobile radio communication device to the second mobile radio base station 708.

Moreover, the first mobile radio area may include at least one mobile radio cell and the second mobile radio area includes at least one mobile radio cell. In an embodiment of the invention, the first mobile radio area and/or the second mobile radio area may be a registration area (e.g. in a UMTS system) or a tracking area (e.g. in an LTE system). Any other supply region may be provided in an alternative embodiment of the invention as the first mobile radio area and/or the second mobile radio area.

Furthermore, in an embodiment of the invention, the mobile radio communication device may receive system information about the second mobile radio area before leaving the first mobile radio area, e.g. by receiving system information blocks (e.g. SIB1) via a shared channel. The mobile radio communication device may leave the first mobile radio area if a predetermined criterion is met.

In an embodiment of the invention, the predetermined time period is started after the occurrence of a predetermined event, wherein the predetermined event may be an event selected from a group of events consisting of:

completion of the entering of the mobile radio communication device into the second mobile radio area, the predetermined criterion for leaving the first mobile radio area is fulfilled.

In an embodiment of the invention, the mobile radio communication device is in an idle state, e.g. in the Idle Mode according to the RRC communication protocol.

FIG. 3 shows a mobile radio communication device (e.g. 110) in accordance with an embodiment of the invention.

In an embodiment of the invention, the mobile radio communication device 110 includes a mobile radio area change controller 302 controlling the change of communication of the mobile radio communication device 110 from a first mobile radio area to a second mobile radio area when the mobile radio communication device 110 is in a state without having a signaling communication connection and a data communication connection with a mobile radio network unit in a first mobile radio area. Furthermore, the mobile radio communication device 110 includes a receiver 304 receiving first signals from the mobile radio network unit of the first mobile radio area and second signals from a mobile radio network unit of a second mobile radio area when the mobile radio communication device 110 leaves the first mobile radio area and enters the second mobile radio area.

In an embodiment of the invention, the receiver 304 is tuned such that it receives the first signals from the mobile radio network unit via a first paging channel of the first mobile radio area. Furthermore, in an embodiment of the invention, the receiver 304 at the same time is tuned such that it receives the second signals from the mobile radio network unit via a second paging channel of the second mobile radio area.

FIG. 4 shows a mobile radio communication device (e.g. 110) in accordance with another embodiment of the invention.

In addition to the embodiment shown in FIG. 3, the mobile radio communication device 110 includes a first memory portion 402 temporarily storing first mobile radio resource data about the first mobile radio area for a predetermined time period, wherein the first mobile radio resource data are used for receiving the first signals from the mobile radio network unit of the first mobile radio area and a second memory portion 404 at least partially at the same time storing second mobile radio resource data about the second mobile radio area, wherein the second mobile radio resource data are used for receiving the second signals from the mobile radio network unit of the second mobile radio area. The first memory portion 402 and the second memory portion 404 may be provided in one common memory (e.g. in a volatile memory (such as e.g. in a dynamic random access memory (DRAM) or in a non-volatile memory (such as e.g. in a Flash memory, e.g. a floating gate memory or a charge trapping memory)) or they may be provided in separate memories.

The first mobile radio resource data about the first mobile radio area may include data about a paging channel used by the mobile radio network unit of the first mobile radio area and the second mobile radio resource data about the second mobile radio area may include data about a paging channel used by the mobile radio network unit of the second mobile radio area.

Furthermore, the receiver may be configured to receive system information about the second mobile radio area before leaving the first mobile radio area.

In an embodiment of the invention, the mobile radio communication device 110 includes a determination unit 406 determining whether a predetermined criterion is met taking the received system information into account. Further, the mobile radio area change controller 302 may be configured to control the change of communication of the mobile radio communication device from the first mobile radio area to the second mobile radio area if the predetermined criterion is fulfilled (in other words to control the switch from the first mobile radio area to the second mobile radio area if the predetermined criterion is fulfilled).

Furthermore, a timer 408 may be provided which provides timing information for determining the predetermined time period. In an embodiment, the timer starts the predetermined time period after the occurrence of a predetermined event.

In an embodiment of the invention, the predetermined event is an event selected from a group of events consisting of:

completion of the entering of the mobile radio communication device into the second mobile radio area, the predetermined criterion for leaving the first mobile radio area is fulfilled.

In an embodiment of the invention, a further timer may be provided which provides further timing information for determining a further time period during which no mobile radio area update process is carried out.

FIG. 5 shows a method 500 for transmitting signals into a mobile radio area in accordance with an embodiment of the invention.

The method includes timing the transmission of paging signals into the mobile radio area such that a mobile communication device being located in the mobile radio area can receive the paging signals of the mobile radio area and paging signals transmitted into another mobile radio area (block 502).

FIG. 6 shows a mobile radio network unit 600 in accordance with an embodiment of the invention.

The mobile radio network unit 600 (which may be a base station (e.g. an eNB), for example) includes a transmitter 602 configured to transmit paging signals into a mobile radio area, the mobile radio network unit 600 is assigned to. Furthermore, the mobile radio network unit 600 includes a controller 604 configured to control the transmission of paging signals into the mobile radio area such that a mobile communication device (e.g. 110) being located in the mobile radio area can receive the paging signals of from the mobile radio network unit 600 and paging signals transmitted into another mobile radio area.

In an embodiment of the invention, the transmitter transmits paging signals into the paging channel of the mobile radio area.

As illustrated above, in an embodiment of the invention, the mobile radio communication device 110 stores (e.g. in the first memory portion 402) the information about the mobile radio resources of the "old" (in other words previous) mobile radio cell after having successfully completed a Cell Reselection procedure, which information is required for receiving (in particular paging) from a base station of the first mobile radio area and transmitting information to a base station of the first mobile radio area. This information is stored in the mobile radio communication device 110 (e.g. in the first memory portion 402) for a predefined time period $T_x$. In an embodiment of the invention, the predefined time period $T_x$ is in the range of about 0 seconds to about 127 seconds, e.g. in the range of about 30 seconds to about 100 seconds, e.g. in the range of about 50 seconds to about 80 seconds.

In an embodiment of the invention, the mobile radio communication device 110 starts a new timer $T_x$ after successfully completing a Cell Reselection procedure.

In the case that the mobile radio communication device 110 moves out of the supply area of the new mobile radio cell (or supply region, e.g. registration area or tracking area) and again enters the supply area of the old mobile radio cell (or supply region, e.g. registration area or tracking area) until the expiration of the timer $T_x$ (in other words until the expiration of the predefined time period), the mobile radio communication device 110 accesses the mobile radio resources of the new mobile radio cell and in addition the mobile radio resources of the old mobile radio cell. In an embodiment of the invention, in this case, the mobile radio communication device 110 listens to the paging channel(s) of the old mobile radio cell as well as to the paging channel(s) of the new mobile radio cell for the predefined time period. Furthermore, the mobile radio communication device 110 transmits its messages to the radio channel(s) of the old mobile radio cell as well as to the radio channel(s) of the new mobile radio cell for the predefined time period.

In an embodiment of the invention, the mobile radio network (e.g. including the one base station or plurality of base stations (eNB) 106 and the Access Gateway (aGW) 112) stores the information about the last location, i.e. the last mobile radio cell and/or the last supply area, in which the mobile radio communication device 110 has been located after having successfully completed a supply area update procedure (e.g. after having successfully completed a registration area update procedure or a tracking area update procedure) for a predefined time period $T_x$. During the predefined time period $T_x$, the mobile radio network then pages the mobile radio communication device 110 in the new mobile radio cell (or new supply region) as well as in the old mobile radio cell (or old supply region).

In an embodiment of the invention, the mobile radio network also starts a similar timer $T_x$ after having successfully completed a supply area update procedure (e.g. after having successfully completed a registration area update procedure or a tracking area update procedure) (in an embodiment of the invention, the timer $T_x$ in the mobile radio network is started independently from the timer $T_x$ in the mobile radio communication device 110. During the time period $T_x$, the mobile radio network pages the mobile radio communication device 110 in the new mobile radio cell (or new supply area) as well as in the old mobile radio cell (or old supply area).

In an embodiment of the invention, no additional functions or requirements for the mobile radio network are provided in case no supply region update procedure (e.g. after having successfully completed a registration area update or a tracking area update) occurs in the context of a mobile radio cell switch.

In another embodiment of the invention, the mobile radio network coordinates the paging events, for example, i.e. the mobile radio network coordinates as at which time instants a user in a mobile radio cell is informed about the transmission of data, between the mobile radio cells so that it is made possible for the mobile radio communication device 110 to listen to the paging events (that is e.g. the transmission of paging messages from the mobile radio network) sent by the base station of the new mobile radio cell and by the base station of the old mobile radio cell. To achieve this, in an embodiment of the invention, the mobile radio network coordinates the transmission of the paging events (e.g. paging messages) such that the paging events of the new mobile radio cell and of the old mobile radio cell do not occur at the same time.

In one embodiment of the invention, the time period $T_x$ may be set in dependence from various system parameters such as e.g. from the traffic load in the mobile radio network or the mobile radio cell(s) (e.g. new mobile radio cell and/or old mobile radio cell), the size of the mobile radio cell(s) (e.g. new mobile radio cell and/or old mobile radio cell), the speed of the mobile radio communication device, etc. By way of example, the time period $T_x$ may be increased with increasing speed of the mobile radio communication device. Furthermore, the time period $T_x$ may be increased with increasing traffic load in the mobile radio network or the mobile radio cell(s) (e.g. new mobile radio cell and/or old mobile radio cell).

In an embodiment of the invention, it is provided that no supply area update procedure is initiated until the expiration of the time period $T_x$, even if a successful Cell Reselection procedure is carried out e.g. back into the old mobile radio cell of the old supply area. In this way, the signaling emergence on the radio interface is reduced.

In an embodiment of the invention, it is provided that the mobile radio communication device can still use the radio resources from the old mobile radio cell that it leaves (for a predetermined time period $T_x$) even if it temporarily leaves the supply region of its mobile radio cell, thereby increasing the probability that it still can be reached.

Furthermore, the timers used in the mobile radio communication device and in the mobile radio network are independent from each other and no signaling via the air interface is required for their synchronization. Furthermore, no additional load is put on the radio resources.

FIG. 7 shows an embodiment 700 of the invention.

The embodiment 700 illustrates a first mobile radio cell 702 (having an assigned first base station 704) and a second mobile radio cell 706 (having an assigned second base station 708). In this embodiment of the invention, it is assumed that initially, a mobile radio communication device 710 is first located in the supply region of the first mobile radio cell 702 and moves along a path temporarily leaving the first mobile radio cell 702, entering the supply region of the second mobile radio cell 706 and re-entering the supply region of the first mobile radio cell 702. The path of the mobile radio communication device 710 according to this embodiment of the invention is symbolized in FIG. 7 with an arrow 712.

In an embodiment of the invention, the mobile radio communication device 710 continuously measures signal characteristics of signals received from the first base station 704 of the first mobile radio cell 702 and signal characteristics of signals received from a base station of one or more mobile radio cells which is/are adjacent to the first mobile radio cell 702 (e.g. from the second base station 708 of the second mobile radio cell 706). Taking into account the measured signal characteristics of the received signals, the mobile radio communication device 710 determines as to whether a predetermined cell reselection criterion is fulfilled for a predefined time period (e.g. it is determined as to whether the signal quality (e.g. the signal-to-noise-ratio) of the signals received from a respective base station is better than a predefined threshold).

In an embodiment of the invention, the mobile radio communication device 710 has no active communication connection for data communication (e.g. data transmission or speech transmission) (neither a signaling communication connection nor a data communication connection). Thus, in an embodiment of the invention, the mobile radio communication device 710 is in the RRC Idle Mode state. Therefore, the mobile radio communication device 710 is known on mobility management (MM) protocol layer level known in the Core Network (e.g. 102) only in a supply area (e.g. registration area or tracking area). Furthermore, as described above, it is assumed that the user of the mobile radio communication device 710 and with him the mobile radio communication device 710 moves in a border region of the first mobile radio cell 702 and the second mobile radio cell 706. In an embodiment of the invention, the first mobile radio cell 702 and the second mobile radio cell 706 belong to two different supply areas. The first mobile radio cell 702 belongs to a first supply area (e.g. first registration area or first tracking area) and the second mobile radio cell 706 belongs to a second supply area (e.g. second registration area or second tracking area).

Initially, at a starting time instant t0 714, it is assumed that the mobile radio communication device 710 is camped on the first mobile radio cell 702 of the first supply area.

At a first time instant $t_1$ 716, it is assumed that the signal quality of the signals received from the second base station 708 is sufficiently high so that the cell reselection criterion for carrying out a cell reselection procedure for switching to the second mobile radio cell 706 is fulfilled. However, the mobile radio communication device 710 is still camped on the first mobile radio cell 702 of the first supply area but has already left the supply region of the first mobile radio cell 702 and is currently located in the supply region of the second mobile radio cell 706.

For the purpose of a possible mobile radio cell reselection, the mobile radio communication device 710 performs measurements with regard to the second mobile radio cell 706 and e.g. reads the system information transmitted from the second base station 708 of the second mobile radio cell 706 (e.g. the system information blocks, e.g. SIB1). The mobile radio communication device 710 is able to determine from the system information received from the second base station 708 of the second mobile radio cell 706 that the second mobile radio cell 706 belongs to the second supply area.

In an embodiment of the invention, as soon as the mobile radio communication device 710 has determined that the cell reselection criterion (or cell reselection criteria) is fulfilled, the mobile radio communication device 710 starts the timer $T_{reselection}$ 718.

Since in this embodiment, the received signals of the second mobile radio cell 706 fulfill the cell reselection criterion (or cell reselection criteria) for the entire time period $T_{reselection}$ 718, the mobile radio communication device 710 now carries out the Cell Reselection procedure to camp on the second mobile radio cell 706 of the second supply area (at 720).

Since the second mobile radio cell 706 belongs to the second supply area (e.g. second registration area or second tracking area), the mobile radio communication device 710 initiates a supply area update procedure (e.g. a registration area update (RAU) procedure or a tracking area update (TAU) procedure). In an embodiment of the invention, the mobile radio communication device 710 and the mobile radio network both start a timer $T_x$ 722. Until the expiration of the timer $T_x$ 722, in an embodiment of the invention, the mobile radio network carries out the paging in the old mobile radio cell (e.g. in the first mobile radio cell 702) of the old supply area (e.g. old registration area or old tracking area), e.g. the first supply area (e.g. first registration area or first tracking area).

In an embodiment, the mobile radio communication device 710 listens to the paging channels (e.g. tunes the receiver to receive the paging channels) of the first mobile radio cell 702 and the second mobile radio cell 706 and is configured such that it is able to use the mobile radio resources of the first mobile radio cell 702 and the mobile radio resources of the second mobile radio cell 706 for data transmission, e.g. to the first base station 704 and the second base station 708, respectively, for the time period represented by the timer $T_x$ 722.

In an embodiment, at 724, the mobile radio communication device 710 receives a call at a time at which the timer $T_x$ 722 is still running in the mobile radio communication device 710 and in the mobile radio network.

In this case, the mobile radio network transmits a paging signal into the first supply area (e.g. first registration area or first tracking area) (symbolized in FIG. 7 by means of a line 730) and into the second supply area (e.g. second registration area or second tracking area) (symbolized in FIG. 7 by means of an arrow 726) in order to inform the mobile radio communication device 710 about the incoming call (e.g. using the first base station 704 and the second base station 708, respectively).

Since at this time, the mobile radio communication device 710 is located outside the supply region of the second mobile radio cell 706, it cannot hear (receive) the paging signal from the second mobile radio cell 706. However, in an embodiment of the invention, the mobile radio communication device 710 also listens to the paging channel of the first mobile radio cell 702 and can thus receive the paging signals sent from the first base station 704. Thus, the mobile radio communication device 710 is informed about the incoming call (in this case by the first base station 704 of the first mobile radio cell 702 on which it is currently not camped).

Then, the mobile radio communication device 710 uses the information about the mobile radio channels of the old mobile radio cell (e.g. the first mobile radio cell 702), which is stored in accordance with an embodiment of the invention and initiates a communication connection setup 728 in an as such conventional manner.

FIG. 8 shows an embodiment 800 of the invention.

In this embodiment, the same assumptions are valid as compared with the embodiment 700 shown in FIG. 7.

The embodiment 800 illustrates a first mobile radio cell 702 (having an assigned first base station 704) and a second mobile radio cell 706 (having an assigned second base station 708). In this embodiment of the invention, it is assumed that initially, a mobile radio communication device 710 is first located in the supply area of the first mobile radio cell 702 and moves along a path temporarily leaving the first mobile radio cell 702, entering the supply area of the second mobile radio cell 706 and re-entering the supply area of the first mobile radio cell 702. The path of the mobile radio communication device 710 according to this embodiment of the invention is symbolized in FIG. 8 with an arrow 712.

In an embodiment of the invention, the mobile radio communication device 710 continuously measures signal characteristics of signals received from the first base station 704 of the first mobile radio cell 702 and signal characteristics of signals received from a base station of one or more mobile radio cells which is/are adjacent to the first mobile radio cell 702 (e.g. from the second base station 708 of the second mobile radio cell 706). Taking into account the measured signal characteristics of the received signals, the mobile radio communication device 710 determines as to whether a predetermined cell reselection criterion is fulfilled for a predefined time period (e.g. it is determined as to whether the signal quality (e.g. the signal-to-noise-ratio) of the signals received from a respective base station is better than a predefined threshold).

In an embodiment of the invention, the mobile radio communication device 710 has no active communication connection for data communication (e.g. data transmission or speech transmission) (neither a signaling communication connection nor a data communication connection). Thus, in an embodiment of the invention, the mobile radio communication device 710 is in the RRC Idle Mode state. Therefore, the mobile radio communication device 710 is known on mobility management (MM) protocol layer level known in the Core Network (e.g. 102) only in a supply area (e.g. registration area or tracking area). Furthermore, as described above, it is assumed that the user of the mobile radio communication device 710 and with him the mobile radio communication device 710 moves in a border region of the first mobile radio cell 702 and the second mobile radio cell 706. In an embodiment of the invention, the first mobile radio cell 702 and the second mobile radio cell 706 belong to two different supply areas. The first mobile radio cell 702 belongs to a first supply area (e.g. first registration area or first tracking area) and the second mobile radio cell 706 belongs to a second supply area (e.g. second registration area or second tracking area).

Initially, at a starting time instant to 714, it is assumed that the mobile radio communication device 710 is camped on the first mobile radio cell 702 of the first supply area.

At a first time instant $t_1$ 716, it is assumed that the signal quality of the signals received from the second base station 708 is sufficiently high so that the cell reselection criterion for carrying out a cell reselection procedure for switching to the second mobile radio cell 706 is fulfilled. However, the mobile radio communication device 710 is still camped on the first mobile radio cell 702 of the first supply area but has already left the supply region of the first mobile radio cell 702 and is currently located in the supply area of the second mobile radio cell 706.

For the purpose of a possible mobile radio cell reselection, the mobile radio communication device 710 performs measurements with regard to the second mobile radio cell 706 and e.g. reads the system information transmitted from the second base station 708 of the second mobile radio cell 706 (e.g. the system information blocks, e.g. SIB1). The mobile radio communication device 710 is able to determine from the system information received from the second base station 708 of the second mobile radio cell 706 that the second mobile radio cell 706 belongs to the second supply area.

In an embodiment of the invention, as soon as the mobile radio communication device 710 has determined that the cell reselection criterion (or cell reselection criteria) is fulfilled, the mobile radio communication device 710 starts the timer $T_{reselection}$ 718.

Since in this embodiment, the received signals of the second mobile radio cell 706 fulfill the cell reselection criterion (or cell reselection criteria) for the entire time period $T_{reselection}$ 718, the mobile radio communication device 710 now carries out the Cell Reselection procedure to camp on the second mobile radio cell 706 of the second supply area (at 720).

Since the second mobile radio cell 706 belongs to the second supply area (e.g. the second registration area or the second tracking area), the mobile radio communication device 710 initiates a supply area update procedure (e.g. a registration area update (RAU) procedure or a tracking area update (TAU) procedure). In an embodiment of the invention, the mobile radio communication device 710 and the mobile radio network both start a timer $T_x$ 722. Until the expiration of the timer $T_x$ 722, in an embodiment of the invention, the mobile radio network carries out the paging in the old mobile radio cell (e.g. in the first mobile radio cell 702) of the old supply area (e.g. old registration area or old tracking area), e.g. the first supply area (e.g. first registration area or first tracking area).

In an embodiment, the mobile radio communication device 710 listens to the paging channels (e.g. tunes the receiver to receive the paging channels) of the first mobile radio cell 702 and the second mobile radio cell 706 and is configured such that it is able to use the mobile radio resources of the first mobile radio cell 702 and the mobile radio resources of the second mobile radio cell 706 for data transmission, e.g. to the first base station 704 and the second base station 708, respectively, for the time period represented by the timer $T_x$ 722.

In an embodiment of the invention, the mobile radio communication device 710 moves back into the supply region of the first mobile radio cell 702 at time instant $t_2$ 802.

For the purpose of a possible new mobile radio cell reselection, the mobile radio communication device 710 performs measurements with regard to the first mobile radio cell 702 and e.g. reads the system information transmitted from the first base station 704 of the first mobile radio cell 702 (e.g. the system information blocks, e.g. SIB1). The mobile radio communication device 710 is able to determine from the system information received from the first base station 704 of the first mobile radio cell 702 that the first mobile radio cell 702 belongs to the first supply area.

In an embodiment of the invention, as soon as the mobile radio communication device 710 has determined that the cell reselection criterion (or cell reselection criteria) for the first mobile radio cell 702 (in an embodiment at time instant $t_3$ 804) is fulfilled, the mobile radio communication device 710 starts the timer $T_{reselection}$ 718 again.

Since in this embodiment, the received signals of the first mobile radio cell 702 fulfill the cell reselection criterion (or cell reselection criteria) for the entire time period $T_{reselection}$ 718, the mobile radio communication device 710 now carries out the Cell Reselection procedure to camp on the first mobile radio cell 702 of the first supply area (at 806). However, in this case, no supply area update (e.g. no registration area update or no tracking area update) procedure is carried out, since the timer $T_x$ 722 is still running.

After the timer $T_x$ 722 has expired (in an embodiment of the invention at time instant $t_4$ 808), the mobile radio communication device 710 initiates a supply area update (e.g. registration area update or tracking area update) back to the first supply area (e.g. first registration area or first tracking area) (block 810).

In an alternative embodiment of the invention, the timer $T_x$ 722 can be started at any other suitable time instant or in response to another suitable event. In an embodiment of the invention, the timer $T_x$ 722 may be re-started after having successfully completed the Cell Reselection procedure to camp on the first mobile radio cell 702 of the first supply area (at 806).

In an embodiment of the invention, the mobile radio communication device 710 and the mobile radio network both start a timer $T_x$ 722. Until the expiration of the timer $T_x$ 722, in an embodiment of the invention, the mobile radio network carries out the paging in the old mobile radio cell (e.g. in the first mobile radio cell 702) of the old supply area (e.g. old registration area or old tracking area), e.g. the first supply area (e.g. first registration area or first tracking area).

In an embodiment, the mobile radio communication device 710 listens to the paging channels (e.g. tunes the receiver to receive the paging channels) of the first mobile radio cell 702 and the second mobile radio cell 706 and is configured such that it is able to use the mobile radio resources of the first mobile radio cell 702 and the mobile radio resources of the second mobile radio cell 706 for data transmission, e.g. to the first base station 704 and the second base station 708, respectively, for the time period represented by the timer $T_x$ 722.

Then, as in the embodiment 700, the mobile radio communication device 710 receives a call at a time at which the timer $T_x$ 722 is still running in the mobile radio communication device 710 and in the mobile radio network.

In this case, the mobile radio network transmits a paging signal into the first supply area (e.g. first registration area or first tracking area) and into the second supply area (e.g. second registration area or second tracking area) in order to inform the mobile radio communication device 710 about the incoming call (e.g. using the first base station 704 and the second base station 708, respectively).

Since at this time, the mobile radio communication device 710 is located outside the supply region of the second mobile radio cell 706, it cannot hear (receive) the paging signal from the second mobile radio cell 706. However, in an embodiment of the invention, the mobile radio communication device 710 also listens to the paging channel of the first mobile radio cell 702 and can thus receive the paging signals sent from the first base station 704. Thus, the mobile radio communication device 710 is informed about the incoming call (in this case by the first base station 704 of the first mobile radio cell 702 on which it is currently not camped).

Then, the mobile radio communication device 710 uses the information about the mobile radio channels of the old mobile radio cell (e.g. the first mobile radio cell 702), which is stored in accordance with an embodiment of the invention and initiates a communication connection setup 728 in an as such conventional manner.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for selecting a supply area, which comprises at least one mobile radio cell and at least one mobile radio network unit, which is configured to call for a mobile radio communication device in the entire supply area in order to be able to determine the residence of the mobile radio communication device on mobile radio cell level, in case of an incoming call or a beginning data transmission, the method comprising:
   a mobile radio communication device, which is in a state without having a signaling and data communication connection with a mobile radio network unit in the first supply area, leaving the first supply area;
   receiving in the mobile radio communication device from the mobile radio network unit of the first supply area first mobile radio resource data about the first supply area and from a mobile radio network unit of the second supply area second mobile radio resource data about the second supply area;
   determining whether signal quality associated with the receiving of the second mobile resource data meets or exceeds a predetermined threshold;
   beginning countdown of a timer, included in the mobile radio communication device, based on the determining of whether the signal quality meets or exceeds the predetermined threshold;
   the mobile radio communication device storing temporarily the first mobile radio resource data before expiration of the countdown of the timer; and
   the mobile radio communication device storing, at least partially during the time the first mobile radio resource data is stored, the second mobile radio resource data about the second supply area, wherein the mobile radio communication device is concurrently enabled to use the first mobile radio resource data for data transmission and reception to the first mobile radio network unit and to use the second mobile radio resource data for data transmission and reception to the second mobile radio network unit.

2. The method of claim 1, wherein the first mobile radio resource data about the first supply area include data about a paging Channel used by the mobile radio network unit of the first supply area, and wherein the second mobile radio resource data about the second supply area include data about a paging Channel used by the mobile radio network unit of the second supply area.

3. The method of claim 1, wherein the mobile radio communication device tunes its receiver to receive the first data communication signals from the mobile radio network unit via a first paging Channel of the first supply area; and wherein the mobile radio communication device at the same time tunes its receiver receive the second data communication signals from the mobile radio network unit via a second paging Channel of the second supply area.

4. The method of claim 1, wherein the first supply area includes at least one mobile radio cell.

5. The method of claim 1, wherein the second supply area includes at least one mobile radio cell.

6. The method of claim 1, further comprising:
   the mobile radio communication device receiving system information about the second supply area before leaving the first supply area; and
   the mobile radio communication device leaving the first supply area if a predetermined criterion is met.

7. The method of claim 1, wherein the mobile radio communication device is in a radio resource control communication protocol idle state.

8. A mobile radio communication device, comprising:
   a supply area change controller that is to control a change of communication of the mobile radio communication device from a first supply area to a second supply area, when the mobile radio communication device is in a state without having a signaling and data communication connection with a mobile radio network unit in the first supply area, wherein the first supply area and the second supply area comprise at least one mobile radio cell and at least one mobile radio network unit, which is configured to call for a mobile radio communication device in the entire supply area in order to be able to determine the residence of the mobile radio communication device on mobile radio cell level, in case of an incoming call or a beginning data transmission;
   a receiver that is to process data received from the mobile radio network unit of the first supply area comprising first mobile radio resource data about the first supply area and from a mobile radio network unit of the second supply area comprising second mobile radio resource data about the second supply area when the mobile radio communication device leaves the first supply area and enters the second supply area;
   a determination unit that is to determine whether signal quality associated with the reception of the second mobile resource data meets or exceeds a predetermined threshold;
   a timer that is to expire after a predetermined time period that is to start based on the determination, by the determination unit, of whether the signal quality meets or exceeds the predetermined threshold;

a first memory portion that is to store temporarily the first mobile radio resource data about the first supply area during the predetermined time period before the expiration of the timer; and a second memory portion that is to store, at least partially during the predetermined time period before expiration of the timer, the second mobile radio resource data about the second supply area, wherein the mobile radio communication device is concurrently enabled to use the first mobile radio resource data for data transmission and reception to the first mobile radio network unit and to use the second mobile radio resource data for data transmission and reception to the second mobile radio network unit.

9. The mobile radio communication device of claim 8, wherein the first mobile radio resource data about the first supply area include data about a paging Channel used by the mobile radio network unit of the first supply area, and wherein the second mobile radio resource data about the second supply area include data about a paging Channel used by the mobile radio network unit of the second supply area.

10. The mobile radio communication device of claim 8, wherein the receiver is tuned to receive the first data communication signals from the mobile radio network unit via a first paging Channel of the first supply area, and wherein the receiver at the same time is tuned to receive the second data communication signals from the mobile radio network unit via a second paging Channel of the second supply area.

11. The mobile radio communication device of claim 8, wherein the first supply area includes at least one mobile radio cell.

12. The mobile radio communication device of claim 8, wherein the second supply area includes at least one mobile radio cell.

13. The mobile radio communication device of claim 8, further comprising:
a timer providing timing information for determining the predetermined time period.

14. The mobile radio communication device of claim 8, wherein the receiver receives system information about the second supply area before leaving the first supply area, wherein the mobile radio communication device further comprises a determination unit for determining whether a predetermined criterion is met taking the received system information into account, and the Controller controlling the change of communication of the mobile radio communication device from the first supply area to the second supply area if the predetermined criterion is fulfilled.

15. The mobile radio communication device of claim 8, further comprising:
a further timer for providing further timing information for determining a further time period during which no supply area update procedure is carried out.

16. The mobile radio communication device of claim 8, wherein the mobile radio communication device is in a radio resource control communication protocol idle State.

* * * * *